United States Patent [19]

Wu et al.

[11] Patent Number: 6,083,393
[45] Date of Patent: Jul. 4, 2000

[54] HYDROPHILIC MEMBRANE

[75] Inventors: Xiaosong Wu, Pensacola; Joel Shertok, Pace; Peter Konstantin, Gulf Breeze, all of Fla.

[73] Assignee: Pall Corporation, East Hills, N.Y.

[21] Appl. No.: 08/958,654

[22] Filed: Oct. 27, 1997

[51] Int. Cl.$^7$ ................................................ B01D 39/00
[52] U.S. Cl. .............................. 210/500.35; 210/500.41; 210/500.36; 210/500.27; 264/4
[58] Field of Search ................ 210/500.95, 500.41, 210/500.38, 500.27, 500.36; 264/41

[56] References Cited

U.S. PATENT DOCUMENTS

| | | | |
|---|---|---|---|
| 3,943,045 | 3/1976 | Cordrey et al. . | |
| 4,377,481 | 3/1983 | Jakabhazy | 264/41 |
| 4,412,922 | 11/1983 | Mir | 210/638 |
| 4,618,533 | 10/1986 | Steuck | 428/315.7 |
| 4,702,840 | 10/1987 | Degen et al. | 210/638 |
| 4,761,233 | 8/1988 | Linder et al. | 210/500.37 |
| 4,845,132 | 7/1989 | Masuoka et al. | 210/500.38 |
| 4,917,793 | 4/1990 | Pitt et al. | 210/490 |
| 4,976,897 | 12/1990 | Callahan et al. | 210/490 |
| 5,004,543 | 4/1991 | Pluskal et al. | 210/490 |
| 5,021,160 | 6/1991 | Wolpert | 210/500.35 |
| 5,057,218 | 10/1991 | Koshoji et al. | 210/500.35 |
| 5,079,272 | 1/1992 | Allegrezza, Jr. et al. | 521/134 |
| 5,137,633 | 8/1992 | Wang | 210/490 |
| 5,145,618 | 9/1992 | MacDonald et al. | 264/46.3 |
| 5,151,189 | 9/1992 | Hu et al. | 210/635 |
| 5,158,721 | 10/1992 | Allegrezza, Jr. et al. | 264/41 |
| 5,209,849 | 5/1993 | Hu et al. | 210/490 |
| 5,264,125 | 11/1993 | MacDonald et al. | 210/500.35 |
| 5,282,971 | 2/1994 | Degen et al. | 210/645 |
| 5,401,410 | 3/1995 | Bell et al. | 210/500.41 |
| 5,407,581 | 4/1995 | Onodera et al. | 210/654 |
| 5,468,390 | 11/1995 | Crivello et al. | 210/490 |
| 5,531,893 | 7/1996 | Hu et al. | 210/654 |
| 5,531,900 | 7/1996 | Raghavan et al. . | |
| 5,547,575 | 8/1996 | Demmer et al. | 210/500.42 |

FOREIGN PATENT DOCUMENTS

| | | |
|---|---|---|
| 0 424 873 | 5/1991 | European Pat. Off. . |
| 0 430 082 | 6/1991 | European Pat. Off. . |
| 97/22406 | 6/1997 | WIPO . |

OTHER PUBLICATIONS

Bergbreiter, *Proc. Am. Chem. Soc.*, 73, 552–553 C1995).
Iwata et al., *Journal of Applied Polymer Science*, 54(1), 125–128 (Oct. 1994).
Yamagishi et al., *Journal of Membrane Science*, 105, 237–247 (1995).

*Primary Examiner*—Ana Fortuna
*Attorney, Agent, or Firm*—Leydig, Voit & Mayer, Ltd.

[57] ABSTRACT

A hydrophilic porous membrane is provided which comprises a network of a non-crystalline hydrophobic polymer and an in situ crosslinked hydrophilic acrylate polymer. A method of preparing such a hydrophilic porous membrane also is provided, wherein a reaction solution of a non-crystalline hydrophobic polymer, a crosslinkable polyfunctional acrylate, a polymerization initiator, and, optionally, a monofunctional monomer, is polymerized in situ and cast to provide a hydrophilic porous membrane.

35 Claims, No Drawings

HYDROPHILIC MEMBRANE

TECHNICAL FIELD OF THE INVENTION

The present invention relates to porous hydrophilic membranes and methods of preparing and using such membranes.

BACKGROUND OF THE INVENTION

In many applications of filtration technology, it is highly desirable to utilize a porous membrane which is both hydrophilic and has desirable bulk properties, such as mechanical strength, flexibility, thermal stability, and chemical stability. Since many known polymers having desirable bulk properties are hydrophobic, it has become important to develop membranes which have the desirable bulk properties of hydrophobic polymers, yet have desirable hydrophilic surface properties which differ dramatically from the properties of the hydrophobic support polymer. Desirable surface properties include wettability, low protein adsorption, thromboresistance, controlled ion exchange capacity, and controlled surface chemical reactivity.

One method of preparing hydrophilic membranes involves graft polymerizing a hydrophilic monomer onto the surface of a porous hydrophobic polymeric membrane substrate. However, it is difficult to apply a graft coating to the entire surface of the substrate without clogging the pores thereof. A typical example of a photochemical grafting process used to hydrophilically modify the surface of a hydrophobic polymer is described in U.S. Pat. No. 5,468,390. A method for grafting a non-graftable substrate is described in U.S. Pat. No. 5,547,575. That method involves coating the substrate with an N-containing polymer, halogenating the coating to form an intermediate N-halogenated species, and then grafting the treated substrate with an ethylenically unsaturated hydrophilic monomer. While this approach might be useful, it is expensive, requiring a coating as well as an N-halogenated intermediate, which is eventually displaced upon grafting of the hydrophilic monomer.

Another method that can be used to impart hydrophilic surface properties to a hydrophobic substrate is to coat a preformed hydrophobic membrane with surfactants or water-soluble polymers, such as polyvinyl pyrrolidone. This approach is substantially limited, particularly due to flux reduction caused by reduction of pore size. Flux reduction is especially severe for membranes having small pore dimensions (e.g., <0.1 μm).

An attempt to address the problem of pore clogging can be found in U.S. Pat. No. 4,976,897 (the '897 patent) which discloses a microporous support coated with a UV curable resin having a sufficiently high viscosity to prevent pore filling upon coating and curing. In order to diminish pore clogging, the '897 patent requires the coating resin to have a viscosity of at least 35,000 centipoise, preferably 50,000 to 500,000 centipoise. As a consequence, this approach is quite limited in terms of the materials which can be used to coat the surface of the membrane. A resin having a low viscosity will result in the resin pooling into the interiors of the pores during the curing process, thereby causing pore clogging and restricted flow across the membrane. Further, resins having viscosities in the higher range may be inappropriate depending on the application. In addition, if the porous polymeric support has too much variation with respect to individual pore diameters, the coating can be unevenly distributed, clogging some pores and insufficiently coating the surfaces of other pores. More importantly, even if the resin viscosity is balanced to maximize membrane coating while minimizing pore blockage, the coating typically will avoid some pore interiors. Thus, only the exterior surface of the membrane may be rendered uniformly hydrophilic. Since the porous interior constitutes the vast majority of the surface area of a porous membrane, the hydrophilic modification in the '897 patent undesirably leaves a significant amount of the surface area of the membrane (i.e., the pore interiors) hydrophobic.

U.S. Pat. No. 4,618,533 (the '533 patent) describes a porous hydrophobic membrane which is modified with a crosslinked hydrophilic polymer such that the entire surface purportedly is rendered hydrophilic without clogging the pores. The membrane is prepared by soaking a porous hydrophobic polyvinylidene floride (PVDF) membrane in a reagent bath containing a free radical polymerizable monomer (e.g., hydroxypropyl acrylate), a polymerization initiator, and a crosslinking agent (e.g., tetraethyleneglycol diacrylate) such that the reagent bath wets the entire surface of the porous membrane. The polymerization and crosslinking reaction is then carried out using high temperatures (e.g., 95° C.). U.S. Pat. No. 4,917,793 applies the method of the '533 patent toward a polytetrafluoroethylene (PTFE) membrane to produce membranes which are transparent in aqueous media.

U.S. Pat. No. 5,158,721 (the '721 patent) purportedly discloses a hydrophilic membrane formed from an interpenetrating network of a hydrophobic polymer and a hydrophilic crosslinked monomeric composition. The membrane is prepared by casting a thin film of the precursors on a substrate and exposing the film to low intensity UV light to form the interpenetrating polymeric network. The polymeric network is then coagulated to form a porous membrane. The membrane then must be annealed in order to render the surface of the resulting membrane hydrophilic. The annealing causes the hydrophobic polymer to become more crystalline thereby excluding the hydrophilic polymer from the crystalline regions and rendering the membrane surface hydrophilic. Although this approach avoids some of the aforementioned disadvantages of thermal coating, it nevertheless involves heat-treating the membrane at high temperature to induce crystallization of the bulk polymer. Further, the '721 patent teaches that the hydrophobic polymers employed in the disclosed process need to be crystalline polymers to render the membrane surface hydrophilic after annealing.

Thus, there remains a need for a porous hydrophilic membrane having the desirable bulk properties commonly found in hydrophobic polymers and also having hydrophilic surface properties uniformly distributed throughout the entire surface of the membrane. Further, there exists a need for an efficient method to prepare such membranes. The present invention provides such a porous hydrophilic membrane and associated methods. These and other objects of the present invention will be apparent from the detailed description of the preferred embodiments of the invention set forth hereinbelow.

BRIEF SUMMARY OF THE INVENTION

The present invention provides a hydrophilic porous membrane comprising a non-crystalline hydrophobic polymer and an in situ crosslinked hydrophilic acrylate polymer. The present invention also provides a filtration device which includes a housing and the hydrophilic porous membrane of the present invention, as well as a method of treating a fluid by contacting the fluid with the present inventive membrane.

The present invention further provides a method of preparing a hydrophilic porous membrane which involves providing a reaction solution of a solvent, a non-crystalline hydrophobic polymer, a crosslinkable polyfunctional acrylate, and a polymerization initiator. The reaction solution optionally includes a polymerizable monofunctional monomer. The reaction solution is subjected to conditions wherein the crosslinkable polyfunctional acrylate undergoes in situ crosslinking to provide a casting solution. The casting solution is then cast to provide the hydrophilic porous membrane of the present invention. No annealing or crystallization of the bulk polymer is required to render the membrane surface hydrophilic.

DETAILED DESCRIPTION OF THE INVENTION

The present invention provides a hydrophilic porous membrane comprising a network of a non-crystalline hydrophobic polymer and an in situ crosslinked hydrophilic acrylate polymer. The non-crystalline hydrophobic polymer can be any polymer, copolymer, blend, mixture, or combination of polymers having various bulk properties, provided the polymer, copolymer, blend, mixture, or combination of polymers is not rendered crystalline under the conditions employed in preparing the membrane. Non-crystalline polymers include glassy polymers and polymers which, due to steric factors, insufficient secondary molecular forces in the polymer structure, or inability to pack into a crystalline state, do not have a general tendency to crystallize under moderate crystallization conditions, which exclude extremes of time, temperature, and pressure. Suitable non-crystalline polymers include polymers such as, for example, polyethersulfones, polysulfones, polyarylsulfides, aryl polyimides, and the like. The non-crystalline polymer can be a blend of polymers wherein one of the components is a semi-crystalline or crystalline polymer such as, for example, ultra high molecular weight polyethylene, polytetrafluoroethylene, and poly(vinylidene fluoride), provided the blend thereof does not impart significant crystallinity to the resulting hydrophilic membrane. Preferably, a non-crystalline polymer blend will contain less than 5% by weight of a crystalline polymer component, more preferably less than 3% by weight of a crystalline polymer component. Most preferably, a non-crystalline polymer blend will contain less than 2% by weight of a crystalline polymer component. Optimally, the non-crystalline polymer is blended with a trace amount of crystalline polymer component, or is not blended with any crystalline polymer components. The non-crystalline polymer can be a non-crystalline copolymer. The copolymer can be a copolymer of a non-crystalline polymer and a crystalline polymer. Preferably, the copolymer contains less than 5% by weight of the crystalline polymer, more preferably less than 2% by weight of the crystalline polymer. Most preferably, the copolymer does not contain a crystalline polymer. In a preferred embodiment, the non-crystalline polymer is a polyethersulfone or a polysulfone, most preferably a polyethersulfone.

The hydrophilic membrane of the present invention utilizes an in situ crosslinked hydrophilic acrylate polymer which forms a polymeric network with the non-crystalline hydrophobic polymer. The in situ crosslinked hydrophilic acrylate polymer can be obtained from the in situ crosslinking of any suitable polyfunctional acrylate. Suitable polyfunctional acrylates include alkyleneglycol polyacrylates such as, for example, ethylene glycol diacrylate, ethylene glycol dimethacrylate, polyethylene glycol diacrylate, polyethylene glycol dimethacrylate, 1,4-butanediol diacrylate, 1,4-butanediol dimethacrylate, 1,3-butyleneglycol diacrylate, 1,3-butyleneglycol dimethacrylate, diethyleneglycol diacrylate, diethyleneglycol dimethacrylate, 1,6-hexanediol diacrylate, 1,6-hexanediol dimethacrylate, neopentylglycol diacrylate, neopentylglycol dimethacrylate, pentaerythritol tetramethacrylate, pentaerythritol triacrylate, tetraethyleneglycol diacrylate, dipentaerythritol monohydroxypenta acrylate, tetraethyleneglycol dimethacrylate, polyethyleneglycol 600 dimethacrylate, polyethyleneglycol 400 dimethacrylate, polyethyleneglycol 200 dimethacrylate, triethyleneglycol diacrylate, triethyleneglycol dimethacrylate, trimethylolpropane ethoxylated triacrylate, trimethylolpropane ethoxylated trimethacrylate, tripropyleneglycol diacrylate, and tripropyleneglycol dimethacrylate.

Preferably, the polyfunctional acrylate is an ethylene glycol diacrylate such as, for example, ethylene glycol diacrylate, ethylene glycol dimethacrylate, polyethylene glycol diacrylate, polyethylene glycol dimethacrylate, diethylene glycol diacrylate, diethylene glycol dimethacrylate, triethylene glycol diacrylate, triethylene glycol dimethacrylate, and combinations thereof.

The ethylene glycol diacrylate desirably is a polyethylene glycol diacrylate. Suitable polyethylene glycol diacrylates include polyethylene glycol diacrylate and polyethylene glycol di(alkyl)acrylates such as, for example, polyethylene glycol dimethacrylate and derivatives thereof. Various species of polyethylene glycol diacrylates can be obtained synthetically or commercially, wherein the number of ethylene glycol units comprising the link between the two acrylate moieties fall within a specified range. Commercially, such polyethylene glycol diacrylates are given a number which represents the average molecular weight of the polyethylene glycol chain comprising the link between the acrylate moieties. For example, the average molecular weight of the polyethylene glycol ("PEG") chains linking the methacrylate units in polyethylene glycol 200 dimethacrylate is approximately 200. Thus, the compound is referred to as being a "PEG 200" compound, specifically "PEG 200 DMA." Other ethylene glycol diacrylates of specified PEG molecular weight, such as polyethylene glycol 400 diacrylate (also called poly(ethylene glycol-400) diacrylate), polyethylene glycol 400 dimethacrylate, and polyethylene glycol 600 dimethacrylate are available commercially from Aldrich Chemical Company, Milwaukee, Wis.

In a preferred embodiment, the polyethylene glycol diacrylate is a polyethylene glycol diacrylate of PEG 200 or greater (e.g., of greater than PEG 200 or even PEG 300). More preferably, the polyethylene glycol diacrylate is a polyethylene glycol diacrylate of PEG 400 or greater. Most preferably, the polyethylene glycol diacrylate is a polyethylene glycol dimethacrylate.

Surprisingly, it has been discovered that the hydrophilic porous membranes have greater stability and are more hydrophilic when the polyfunctional acrylate is a polyethylene glycol diacrylate. It has been further discovered that membrane stability and hydrophilicity can be further enhanced by increasing the PEG value of the polyethylene glycol diacrylate.

A highly preferred embodiment of the present invention is directed to a hydrophilic membrane formed from an in situ crosslinked hydrophilic acrylate copolymer derived from a polyfunctional acrylate and, additionally, a monofunctional monomer. In this particular embodiment, the polyfunctional acrylate can be any suitable polyfunctional acrylate as described above, and is preferably an alkylene glycol polyacrylate. Preferred alkylene glycol polyacrylates are as described above.

The term "monofunctional monomer" as used herein refers to a monomer having no more than one functional group which undergoes polymerization with the polyfunctional acrylate. The monofunctional monomer can be any suitable monomer having one functional group which undergoes polymerization with the polyfunctional acrylate. Suitable monofunctional monomers can include neutral monomers, monomers with an acidic group or basic group, or monomers with a charged group. Preferably, the monofunctional monomer is a monomer with a polymerizable residue which is acryloyl.

Suitable neutral monofunctional monomers include hydroxy- and alkoxyalkyl acrylates, such as, for example, 2-hydroxyethyl acrylate, 2-hydroxyethyl methacrylate, hydroxypropyl acrylate, hydroxypropyl methacrylate, 2-methoxyethyl acrylate, 2-phenoxyethyl acrylate, 2-phenoxyethyl methacrylate, and combinations thereof. Preferably, the neutral monofunctional monomer is a hydroxyalkyl acrylate, more preferably a hydroxyalkyl methacrylate, and most preferably a hydroxyethyl methacrylate. Accordingly, in a highly preferred embodiment of the present invention, the crosslinked hydrophilic acrylate polymer is derived from a polyfunctional acrylate which is polyethylene glycol dimethacrylate of PEG 400 or greater and a monofunctional monomer which is hydroxyethyl methacrylate.

Suitable monofunctional monomers with an acidic group include acrylamido organic acids such as, for example, acrylamidocarboxylic acids, acrylamidophosphonic acids, and acrylamidosulfonic acids. Acrylamido organic acids include acrylamidoalkyl organic acids and acrylamidoaryl organic acids. It is well known in the art that a charge can be imparted to acidic groups, for example, by converting at least some of the acidic groups to their corresponding metal and/or ammonium salts. For example, the acidic monofunctional monomer can be an acrylamidosulfonic acid monomer having the formula:

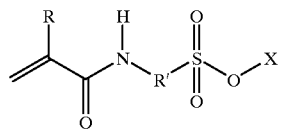

wherein R is H, $C_1$–$C_6$ alkyl, or aryl; R' is a $C_1$–$C_{10}$ alkyl diradical or an aryl diradical; and X is H, alkali metal, ammonium, or tetraalkylammonium.

Suitable monofunctional monomers with a basic group include aminoalkyl acrylates, such as, for example, (dialkylamino)alkyl acrylate. Examples of (dialkylamino) alkyl acrylates include compounds such as 2-(dimethylamino)ethyl acrylate, 2-(dimethylamino)ethyl methacrylate, 2-(diethylamino)ethyl methacrylate. Other examples of (dialkylamino)alkyl acrylates include alkyl acrylates wherein the alkyl group is appended with a cyclic amine substituent such as, for example, morpholinoethyl acrylate, morpholinoethyl methacrylate, and the like.

It is well known in the art that a basic amine substituent can be converted into a charged group by conversion of the amine to an ammonium salt. Ammonium salts can be obtained by protonation with a suitable protic acid or by quaternization with a suitable alkylating agent. Monofunctional monomers with a charged amino substituent include (trialkylammonium)alkyl acrylates such as, for example, 2-(dimethylamino)ethyl acrylate, methyl sulfate quaternary ammonium salt, and 2-(dimethylamino)ethyl methacrylate, methyl sulfate quaternary ammonium salt.

The present invention further provides a filtration device which employs the hydrophilic porous membrane of the present invention. The filtration device can be in any form such as, for example, a cartridge, a plate-frame assembly, a disc, and the like. The filtration device of the present invention comprises a housing and the hydrophilic porous membrane of the present invention. The hydrophilic membrane of the present invention can be in any suitable form and can be utilized as an integral part of a filter element.

The present invention further provides a method of treating a fluid by contacting a fluid with the hydrophilic microporous membrane of the present invention. In a preferred embodiment, the method of treating a fluid of the present invention involves contacting a fluid (e.g., an aqueous fluid) with the membrane of the present invention, passing the fluid through the membrane to provide a filtrate (e.g., removing a substance from the fluid), and recovering the filtrate and/or the retentate.

The present invention further provides a method of preparing a hydrophilic porous membrane which comprises preparation of a reaction solution in which a non-crystalline hydrophobic polymer, a crosslinkable polyfunctional acrylate, and a polymerization initiator are dissolved in a suitable solvent. The reaction solution is then subjected to conditions which cause the crosslinkable polyfunctional acrylate to undergo crosslinking in situ, thereby providing a casting solution. The casting solution is cast to provide the hydrophilic porous membrane of the present invention. No annealing or crystallization is required to render the membrane surface hydrophilic. Of course, the membrane can be cast using a variety of methods known to those in the art such as, for example, casting in an environmentally controlled chamber or by quenching with a non-solvent.

The term "non-crystalline hydrophobic polymer" as used in the present inventive method includes non-crystalline hydrophobic polymers as described hereinabove. Preferably, the non-crystalline hydrophobic polymer is a polyethersulfone or a polysulfone. More preferably, the non-crystalline hydrophobic polymer is a polyethersulfone. The non-crystalline hydrophobic polymer is generally present in the reaction solution at concentrations ranging from about 5% by weight to about 25% by weight, preferably from about 10% to about 20%, more preferably from about 10% to about 15%.

The term "crosslinkable polyfunctional acrylate" as used in the present inventive method includes the polyfunctional acrylates as described hereinabove. Preferably, the crosslinkable polyfunctional acrylate is an alkylene glycol polyacrylate, more preferably a polyethylene glycol diacrylate. Most preferably, the polyethylene glycol diacrylate is a polyethylene glycol diacrylate of PEG 200 or greater, particularly a polyethylene glycol diacrylate of PEG 400 or greater. The polyethylene glycol diacrylate desirably is a polyethylene glycol dimethacrylate. The crosslinkable polyfunctional acrylate is generally present in the reaction solution in concentrations ranging from about 0.05% to about 10% by weight, preferably from about 0.1% to about 3% by weight, more preferably from about 0.2% to about 1% by weight.

The conditions which provide for in situ crosslinking of the polyfunctional acrylate can be any suitable conditions that effect the crosslinking of the polyfunctional acrylate. Generally, such conditions will include the application of any suitable energy source for initiating free radical polymerization such as heat, ultraviolet light, gamma radiation, electron beam radiation, and the like.

The polymerization initiator can be any suitable initiator which promotes free radical polymerization of the crosslinkable reagents in the reaction solution. Suitable polymerization initiators include thermal initiators such as, for example, 4,4'-azobis(4-cyanovaleric acid), ammonium persulfate, sodium persulfate, and the like. Suitable photochemical initiators include, for example, benzoin ethers such as isopropyl benzoin ether and butyl benzoin ether and the like; benzophenones such as benzophenone and Michler's ketone; acetophenones such as 2-hydroxy-2-methyl-1-phenylpropane-1-one, α,α-dimethoxy-α-hydroxyacetophenone; and the like. The initiator may be used in any suitable concentration which promotes the propagation of free radicals. Photochemical initiators generally are used in concentrations ranging from about 0.1% to about 10% by weight, preferably from about 1% to about 5% by weight, of the reaction solution. Thermal initiators generally are used in concentrations ranging from about 0.01% to about 5% by weight, preferably from about 0.05% to about 0.5% by weight, of the reaction solution.

In a preferred embodiment, the crosslinking reaction is carried out thermally at a temperature from about 65° F. (18° C.) to about 120° F. (49° C.). The temperature is preferably in the range from about 80° F. (27° C.) to about 105° F. (41° C.), more preferably from about 90° F. (32° C.) to about 100° F. (38° C.). In a preferred embodiment, the initiator is a persulfate initiator.

Any suitable solvent can be used in the present inventive method of preparing a hydrophilic porous membrane. Suitable solvents include, for example, N-methyl pyrollidone, dimethylacetamide, dimethylformamide, dimethylsulfoxide, and the like. The solvent is generally present in the reaction solution in ranges from about 1% to about 60% by weight, preferably from about 5% to about 40% by weight, more preferably from about 10% to about 30% by weight. In a preferred embodiment of the present inventive method, the solvent is N-methyl pyrrollidone.

As will be appreciated by those of ordinary skill in the art, pore-forming agents, cosolvents, viscosity enhancing agents, and nonsolvents can be used as components of the reaction solution of the present inventive method. In a preferred embodiment of the present inventive method, the reaction solution includes polyethylene glycol which is present in concentrations ranging from about 30% to about 85% by weight, preferably from about 40% to about 75% by weight, more preferably from about 55% to about 70% by weight.

The general technique of casting a resin solution and forming a porous membrane is well-known to those in the art. For example, such a technique is described in U.S. Pat. Nos. 4,340,479 and 4,707,266.

In a highly preferred embodiment, the method of preparing the hydrophilic porous membrane of the present invention further employs a monofunctional monomer in the reaction solution. The term "monofunctional monomer" is used synonymously as the term is defined hereinabove. Suitable monofunctional monomers include the above-defined neutral monomers, monomers with an acidic group or basic group, and monomers with a charged group. The monofunctional monomer is generally present in the reaction solution at concentrations from about 0.05% to about 5% by weight, preferably from 0.1% to about 2% by weight, more preferably from about 0.1% to about 0.5% by weight.

Preferably, the monofunctional monomer is a monomer with an acryloyl polymerizable residue as defined hereinabove. In a further preferred embodiment, the crosslinkable polyfunctional acrylate is a polyethylene glycol dimethacrylate of PEG 400 or greater and the monofunctional monomer is 2-hydroxyethyl methacrylate.

The present inventive membrane can be post-treated in any suitable manner. Such post-treatments typically are dictated by the particular applications in which the membrane will be used and the conditions encountered therein. The post-treatment of membranes is generally known in the art.

The following examples further illustrate the present invention but, of course, should not be construed as in any way limiting its scope.

EXAMPLE 1

This example describes a particular embodiment of the present invention. The membrane provided by the inventive method herein is a hydrophilic porous membrane formed from a network of polyethersulfone and the product derived from the in situ crosslinking of polyethylene glycol dimethacrylate.

The components shown in TABLE 1 were weighed and mixed in a stainless steel blender to provide a mixture having a combined total mass of 300 g. The mixture was stirred for 30 minutes at 90–95° F. (32–35° C.)

TABLE 1

| Components | % by Weight |
| --- | --- |
| Polyethylene Glycol | 68.1 |
| Polyethersulfone | 13 |
| N-methyl Pyrrolidone (NMP) | 18 |
| Polyethylene Glycol Dimethacrylate (PEGDMA) | 0.8 |
| Ammonium Persulfate | 0.1 |

The resulting mixture was cast in an environmentally controlled casting chamber to provide a porous membrane. The cast membrane was washed with water and oven dried at 85–90° C. for 30 minutes. The dried membrane was hydrophilic. After 3 hours of isopropyl alcohol (IPA) Soxhlet extraction, the membrane remained hydrophilic. The surface energy of the membrane was in the range of about 76–78 dyne/cm after the IPA Soxhlet extraction.

EXAMPLE 2

This example describes the preparation of two membranes of the present invention. The membranes provided by the present inventive method herein are hydrophilic porous membranes formed from a network of polyethersulfone and the product derived from the in situ crosslinking of polyethylene glycol dimethacrylate and 2-hydroxyethyl methacrylate.

The membranes were prepared in the same manner as described in Example 1, except that the components used in this example are as shown in TABLE 2.

TABLE 2

| Components | Formula 2A (% by weight) | Formula 2B (% by weight) |
| --- | --- | --- |
| Polyethylene Glycol | 68.1 | 68.1 |
| Polyethersulfone | 13 | 13 |
| NMP | 18 | 18 |
| PEGDMA | 0.5 | 0.5 |
| 2-Hydroxyethyl Methacrylate (HEMA) | 0.3 | 0.3 |
| Ammonium Persulfate | 0.1 | — |
| Sodium Persulfate | — | 0.1 |

The components of Formula 2A were used in the same manner as set forth in EXAMPLE 1 to provide a first membrane (Membrane 2A). The same procedure was repeated using the components of Formula 2B to provide a second membrane (Membrane 2B). Both membranes were hydrophilic after drying. After 3 hours of isopropyl alcohol (IPA) Soxhlet extraction, the membranes remained hydrophilic. The surface energies of both membranes were in the range of about 76–78 dyne/cm after the IPA Soxhlet extraction.

EXAMPLE 3

This example illustrates the enhancement of membrane stability and hydrophilicity of the hydrophilic membrane of the present invention as a result of increasing the PEG value of the polyfunctional acrylate.

Two membranes were prepared, Membrane 3A and Membrane 3B, which differed only in the PEG value of the polyethylene glycol diacrylate crosslinker (polyethylene glycol dimethacrylate), denoted "PEG(Molecular Weight) DMA". The two membranes were then tested for hydrophilicity before and after IPA Soxhlet extraction. The components used in the preparation of these membranes are shown in TABLE 3.

TABLE 3

| Components | Formula 3A (% by weight) | Formula 3B (% by weight) |
|---|---|---|
| Polyethylene Glycol | 61.9 | 61.9 |
| NMP | 24 | 24 |
| Polyethersulfone | 13 | 13 |
| PEG(400)DMA | 0.7 | — |
| PEG(200)DMA | — | 0.7 |
| HEMA | 0.3 | 0.3 |
| Ammonium Persulfate | 0.1 | 0.1 |

The components of Formula 3A were weighed and mixed in a stainless steel blender at 95–115° F. (35–46° C.). A membrane was prepared by casting the resulting mixture on a substrate in an environmentally controlled gelation chamber. The resulting membrane was then washed in a water bath and dried in a conventional oven to provide Membrane 3A, which has a PEG 400 polyethylene glycol dimethacrylate crosslinker. The identical procedure was repeated using the components of Formula 3B to provide Membrane 3B, which has a PEG 200 polyethylene glycol dimethacrylate crosslinker. The hydrophilic properties of the two membranes were evaluated, and the results are shown in TABLE 4. The water flow rate of each of the membranes was determined at a pressure of 10 psi (69 kPa). The "wet in" (wettability) of the dried membranes was determined before and after 3 hours of IPA Soxhlet extraction, as represented by the maximum percentage of aqueous NaCl (by weight) which wetted the membrane.

The surface tension of an aqueous NaCl solution increases with increasing concentration (or weight percent) of NaCl. The maximum surface tension of a NaCl solution which wets a membrane is an indication of the membrane's hydrophilicity. Thus, a membrane which is wettable by an aqueous solution of particular NaCl concentration is more hydrophilic than a membrane which requires a lower NaCl concentration before exhibiting wettability.

TABLE 4

| | Membrane 3A (PEG 400 DMA) | Membrane 3B (PEG 200 DMA) |
|---|---|---|
| Water Bubble Point (psi) [kpa] | 42.0 [289] | 44.2 [304] |
| Water Flow Rate (ml/min/cm$^2$) | 48.6 | 45.3 |
| Thickness (mils) [$\mu$m] | 4.3 [109] | 4.2 [107] |
| Wet in (before Soxhlet extraction) | 15% NaCl (by weight) | 10% NaCl (by weight) |
| Wet in (after Soxhlet extraction) | 15% NaCl (by weight) | 5% NaCl (by weight) |

The results in TABLE 4 clearly demonstrate that there is a benefit attendant the use of a crosslinker with a higher PEG value. Membrane 3A (utilizing PEG 400 DMA) is more hydrophilic than Membrane 3B (utilizing PEG 200 DMA) before IPA Soxhlet extraction (Membrane 3A is wettable in 15% NaCl versus 10% NaCl for Membrane 3B). These data further demonstrate that Membrane 3A is more stable than Membrane 3B. In particular, Membrane 3A retained 100% of its hydrophilicity, reflected by wettability, after 3 hours of IPA Soxhlet extraction, whereas the hydrophilicity of Membrane 3B was reduced by 50% after 3 hours of IPA Soxhlet extraction.

All of the references, including patents and present application, cited herein are hereby incorporated in their entireties by reference.

While particular embodiments of the invention have been shown, it will of course be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A hydrophilic porous membrane comprising a network of a non-crystalline hydrophobic polymer and an in situ crosslinked hydrophilic acrylate polymer.

2. The hydrophilic porous membrane of claim 1, wherein said non-crystalline hydrophobic polymer comprises a polymer selected from the group consisting of polyethersulfone, polysulfone, polyarylsulfide, and aryl polyimides.

3. The hydrophilic porous membrane of claim 1, wherein said crosslinked hydrophilic acrylate polymer comprises a polyfunctional acrylate.

4. The hydrophilic porous membrane of claim 3, wherein said polyfunctional acrylate is an alkylene glycol polyacrylate.

5. The hydrophilic porous membrane of claim 4, wherein said alkylene glycol polyacrylate is a polyethylene glycol diacrylate.

6. The hydrophilic porous membrane of claim 5, wherein said polyethylene glycol diacrylate is a polyethylene glycol dimethacrylate.

7. The hydrophilic porous membrane of claim 6, wherein said polyethylene glycol dimethacrylate is a polyethylene glycol dimethacrylate of PEG 200 or greater.

8. The hydrophilic porous membrane of claim 6, wherein said polyethylene glycol dimethacrylate is a polyethylene glycol dimethacrylate of PEG 400 or greater.

9. The hydrophilic porous membrane of claim 3, wherein said polyfunctional acrylate is selected from the group consisting of ethylene glycol diacrylate, ethylene glycol dimethacrylate, polyethylene glycol diacrylate, polyethylene glycol dimethacrylate, diethylene glycol diacrylate, diethylene glycol dimethacrylate, triethylene glycol diacrylate, triethylene glycol dimethacrylate, and combinations thereof.

10. The hydrophilic porous membrane of claim 1, wherein said crosslinked hydrophilic acrylate polymer is a copolymer comprising a polyfunctional acrylate and a monofunctional monomer.

11. The hydrophilic porous membrane of claim 10, wherein said polyfunctional acrylate is an alkylene glycol polyacrylate.

12. The hydrophilic porous membrane of claim 11, wherein said alkylene glycol polyacrylate is a polyethylene glycol diacrylate.

13. The hydrophilic porous membrane of claim 12, wherein said polyethylene glycol diacrylate is a polyethylene glycol dimethacrylate.

14. The hydrophilic porous membrane of claim 12, wherein said polyethylene glycol diacrylate is a polyethylene glycol diacrylate of PEG 200 or greater.

15. The hydrophilic porous membrane of claim 14, wherein said polyethylene glycol diacrylate is a polyethylene glycol diacrylate of PEG 400 or greater.

16. The hydrophilic porous membrane of claim 10, wherein said monofunctional monomer is selected from the group consisting of 2-hydroxyethyl acrylate, 2-hydroxyethyl methacrylate, hydroxypropyl acrylate, hydroxypropyl methacrylate, 2-methoxyethyl acrylate, 2-phenoxyethyl acrylate, 2-phenoxyethyl methacrylate, and combinations thereof.

17. The hydrophilic porous membrane of claim 10, wherein said monofunctional monomer is an acrylamidosulfonic acid monomer.

18. The hydrophilic porous membrane of claim 10, wherein said monofunctional monomer is a (trialkylammonium)alkyl acrylate.

19. The hydrophilic porous membrane of claim 10, wherein said monofunctional monomer is a (dialkylamino)alkyl acrylate.

20. The hydrophilic porous membrane of claim 10, wherein said polyfunctional acrylate is a polyethylene glycol dimethacrylate of PEG 400 or greater and said monofunctional monomer is 2-hydroxyethyl methacrylate.

21. A filtration device comprising a housing and the hydrophilic porous membrane of claim 1.

22. A method of treating a fluid comprising contacting a fluid with the hydrophilic microporous membrane of claim 1.

23. A method of preparing a hydrophilic porous membrane comprising:

(a) providing a reaction solution comprising a solvent, a non-crystalline hydrophobic polymer, a crosslinkable polyfunctional acrylate, and a polymerization initiator, (b) subjecting said reaction solution to conditions wherein said crosslinkable polyfunctional acrylate undergoes crosslinking in situ to provide a casting solution, and (c) casting said casting solution to provide said hydrophilic porous membrane comprising a network of a non-crystalline hydrophobic polymer and an in situ crosslinked hydrophilic acrylate polymer.

24. The method of claim 23, wherein said non-crystalline hydrophobic polymer comprises a polymer selected from the group consisting of polyethersulfone, polysulfone, polyarylsulfide, and aryl polyimides.

25. The method of claim 23, wherein said crosslinkable polyfunctional acrylate is an alkylene glycol polyacrylate.

26. The method of claim 25, wherein said alkylene glycol polyacrylate is a polyethylene glycol diacrylate.

27. The method of claim 26, wherein said polyethylene glycol diacrylate is a polyethylene glycol dimethacrylate.

28. The method of claim 26, wherein said polyethylene glycol diacrylate is a polyethylene glycol diacrylate of PEG 200 or greater.

29. The method of claim 26, wherein said polyethylene glycol diacrylate is a polyethylene glycol diacrylate of PEG 400 or greater.

30. The method of claim 23, wherein said reaction solution further comprises a monofunctional monomer.

31. The method of claim 30, wherein said monofunctional monomer is selected from the group consisting of 2-hydroxyethyl acrylate, 2-hydroxyethyl methacrylate, hydroxypropyl acrylate, hydroxypropyl methacrylate, 2-methoxyethyl acrylate, 2-phenoxyethyl acrylate, 2-phenoxyethyl methacrylate, and combinations thereof.

32. The method of claim 30, wherein said monofunctional monomer is an acrylamidosulfonic acid monomer.

33. The method of claim 30, wherein said monofunctional monomer is a (trialkylammonium)alkyl acrylate.

34. The method of claim 30, wherein said monofunctional monomer is a (dialkylamino)alkyl acrylate.

35. The method of claim 30, wherein said crosslinkable polyfunctional acrylate is a polyethylene glycol dimethacrylate of PEG 400 or greater and said monofunctional monomer is 2-hydroxyethyl methacrylate.

* * * * *